(12) United States Patent
Holt

(10) Patent No.: US 11,982,235 B2
(45) Date of Patent: May 14, 2024

(54) FUEL SYSTEM

(71) Applicant: ROLLS-ROYCE plc, London (GB)

(72) Inventor: Jonathan E. Holt, Derby (GB)

(73) Assignee: Rolls-Royce plc, London (GB)

(*) Notice: Subject to any disclaimer, the term of this patent is extended or adjusted under 35 U.S.C. 154(b) by 2 days.

(21) Appl. No.: 18/181,626

(22) Filed: Mar. 10, 2023

(65) Prior Publication Data

US 2023/0304441 A1     Sep. 28, 2023

(30) Foreign Application Priority Data

Mar. 23, 2022 (GB) .................................. 2204068

(51) Int. Cl.
*F02C 7/224* (2006.01)
*F02C 7/236* (2006.01)
*F02C 3/22* (2006.01)

(52) U.S. Cl.
CPC .............. *F02C 7/236* (2013.01); *F02C 7/224* (2013.01); *F02C 3/22* (2013.01); *F05D 2220/62* (2013.01); *F05D 2260/213* (2013.01)

(58) Field of Classification Search
CPC ...................................................... F02C 7/236
See application file for complete search history.

(56) References Cited

U.S. PATENT DOCUMENTS

| 4,989,411 A | 2/1991 | Hoopes et al. |  |
| 5,014,508 A | 5/1991 | Lifka |  |
| 11,674,443 B2 * | 6/2023 | McCurdy | F02C 7/224 |
|  |  |  | 60/736 |
| 2015/0344144 A1 * | 12/2015 | Kamath | F02C 7/236 |
|  |  |  | 244/135 C |

FOREIGN PATENT DOCUMENTS

| EP | 3623604 A1 | 3/2020 |
| GB | 2190964 A | 12/1987 |
| JP | 2001241304 A2 | 9/2001 |
| JP | 2003166428 A2 | 6/2003 |

OTHER PUBLICATIONS

Great Britian search report dated Sep. 21, 2022, issued in GB Patent Application No. 2204068.7.
Extended Search Report from counterpart European Application No. 23158394.9 dated Oct. 16, 2023, 9 pp.

* cited by examiner

*Primary Examiner* — Gerald L Sung
*Assistant Examiner* — Alyson Joan Harrington
(74) *Attorney, Agent, or Firm* — Shumaker & Sieffert, P.A.

(57) ABSTRACT

Disclosed is a fuel system for a gas turbine engine having a core exhaust and a combustion section. The system comprises a fuel pump for fluid communication with a fuel reservoir; a driving turbine for driving the fuel pump; and an air feed to drive the driving turbine, the air feed being fluidly connectable to the core exhaust of the gas turbine engine. Also disclosed is a fuel system comprising: a fuel pump for fluid communication with a fuel reservoir; a fuel line from the fuel pump for fluid communication with the combustion section of the gas turbine engine; and an air feed to a heat exchanger, the air feed being fluidly connectable to the core exhaust of the gas turbine engine, wherein the fuel line is in thermal communication with the air feed within a heat exchanger.

8 Claims, 2 Drawing Sheets

FUEL SYSTEM

CROSS-REFERENCE TO RELATED APPLICATIONS

This specification is based upon and claims the benefit of priority from United Kingdom patent application number GB 2204068.7 filed on Mar. 24, 2022, the entire contents of which is incorporated herein by reference.

BACKGROUND

Technical Field

The present disclosure relates to a fuel system for a gas turbine engine. In particular, the present disclosure relates to systems and methods for pumping liquid hydrogen fuel. Also disclosed are aircrafts including such systems.

Description of the Related Art

Gas turbine engines typically use kerosene fuel which is pumped into a combustion section of an engine for combustion in the presence of compressed air provided into the combustion section from an upstream fan via various compressor stages. The fuel is typically pumped using a low-pressure centrifugal pump and a high-pressure gear pump.

Liquid hydrogen has recently become of interest as a fuel for gas turbine engines but liquid hydrogen present problems for the existing pumping approaches because of the low lubricity of liquid hydrogen and the differing mechanical properties compared to kerosene.

Hydrogen burning rockets use high speed turbo pumps driven by a driving turbine powered by the burning of a small proportion of the hydrogen fuel. These pumps are capable of the high rotational speeds (typically 100,000 RPM) necessary to pump liquid hydrogen. However, these high rotational speeds are likely to preclude the use of traditional driving means such as electric drives and gearboxes.

In general, the efficiency of a gas turbine engine increases as the temperature of the fuel entering the combustion section increases.

Kerosene fuel is typically pre-heated prior to entry into the combustion section of the engine using heat picked up by the engine lubrication system during lubrication/cooling of the engine bearings. This heat transfer from the lubrication system to the fuel occurs within a heat exchanger.

Liquid hydrogen has a very low temperature (25K) and thus this temperature needs to be increased significantly before entry into the combustion section of the engine. Ideally, the temperature of the liquid hydrogen needs to be increased to at least 70K in order to obtain an acceptable engine efficiency and thus a significant amount of heat input is required if a liquid hydrogen fuel is to be used. Liquid hydrogen will be gaseous at the temperatures needed for combustion section entry.

There is a need to provide a fuel system for a gas turbine engine that can accommodate the challenges posed by the use of liquid hydrogen fuel.

The present disclosure has been devised with the above considerations in mind.

SUMMARY

According to a first aspect there is provided a fuel system for a gas turbine engine having a core exhaust and a combustion section, the system comprising: a fuel pump for fluid communication with a fuel reservoir; a driving turbine for driving the fuel pump; and an air feed to drive the driving turbine, the air feed being fluidly connectable to the core exhaust of the gas turbine engine.

By using an air feed from the core exhaust of the gas turbine engine to drive a driving turbine which, in turn drives the fuel pump, the present inventors have found that the fuel pump can be operated at rotational speeds high enough to pump liquid hydrogen within a gas turbine engine without the need for traditional drives/gears and without the need for burning fuel to drive the driving turbine.

In some embodiments of the first aspect, the system may comprise a fuel line from the fuel pump for fluid communication with the combustion section of the gas turbine engine, the fuel line being in thermal communication with the air feed within a heat exchanger. The heat exchanger may form part of the fuel system.

The heat exchanger also effects cooling of the air within the air feed prior to it driving the driving turbine.

Accordingly, in a second aspect, there may be provided a fuel system for a gas turbine engine having a core exhaust and a combustion section, the system comprising: a fuel pump for fluid communication with a fuel reservoir; a fuel line from the fuel pump for fluid communication with the combustion section of the gas turbine engine; and an air feed to a heat exchanger, the air feed being fluidly connectable to the core exhaust of the gas turbine engine, wherein the fuel line is in thermal communication with the air feed within the heat exchanger.

By using heat exchange from an air feed from the core exhaust of the gas turbine engine to heat fuel within a fuel line, the fuel can be heated to a temperature required for entry into the combustion section of the gas turbine engine which increases the efficiency of the engine whilst minimising additional heat input into the system.

In some embodiments of the second aspect, the fuel system further comprises a driving turbine for driving the fuel pump, the driving turbine being driven by the air feed. The air feed will have been cooled within the heat exchanger prior to powering the driving turbine.

Preferred embodiments combine the features of the first and second aspects so that the air feed from the core exhaust can both drive the driving turbine to effect pumping of the fuel and pre-heat the pumped fuel prior to entry into the combustion section of the gas turbine engine.

Optional features of the first and second aspects will now be described.

In some embodiments, the fuel pump may comprise a turbo pump.

In some embodiments, the system may further comprise a fuel reservoir configured to contain liquid hydrogen. For example, the fuel reservoir may be a cryogenic fuel reservoir e.g., cooled to around 25K. In some embodiments, the system further comprises cryogenic pipework connecting the fuel reservoir to the fuel pump.

In some embodiments the fuel reservoir is located proximate e.g. adjacent the fuel pump in order to minimise pipework, e.g. cryogenic pipework, between the fuel reservoir and fuel pump.

In some embodiments, the fuel system comprises a fuel metering unit for metering flow of fuel to the fuel pump. The fuel metering unit may be upstream of the heat exchanger.

In a third aspect, there is provided an aircraft comprising a fuel system according to the first or second aspect.

According to a fourth aspect, there is provided a method of operating a fuel system in a gas turbine engine having a core exhaust and a combustion section, the method comprising:

powering a driving turbine using an air feed from the core exhaust of the gas turbine engine;

providing fuel to a fuel pump from a fuel reservoir; and driving the fuel pump using the air-powered driving turbine.

In some embodiments of the fourth aspect, the method may comprise driving the fuel pump to pump fuel along a fuel line from the fuel pump to the combustion section of the gas turbine engine. The method may further comprise heating the fuel within the fuel line using heat from the air feed within a heat exchanger.

In a fifth aspect, there may be provided a method of operating a fuel system in a gas turbine engine having a core exhaust and a combustion section, the method comprising:

providing fuel to a fuel pump from a fuel reservoir;

driving the fuel pump to pump fuel along a fuel line from the fuel pump to the combustion section of the gas turbine engine; and heating the fuel in the fuel line within a heat exchanger using heat from an air from the core exhaust of the gas turbine engine.

In some embodiments of the fifth aspect, the method further comprises:

powering a driving turbine using the air feed from the core exhaust of the gas turbine engine; and driving the fuel pump using the air-powered driving turbine.

Preferred embodiments combine the features of the fourth and fifth aspects so that the air feed from the core exhaust both drives the driving turbine to effect pumping of the fuel and pre-heats the pumped fuel prior to entry into the combustion section of the gas turbine engine.

In some embodiments of the fourth and fifth aspects, the fuel is liquid hydrogen.

The pump may comprise a turbo pump.

In some embodiments, the method comprises metering flow of fuel to the fuel pump.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
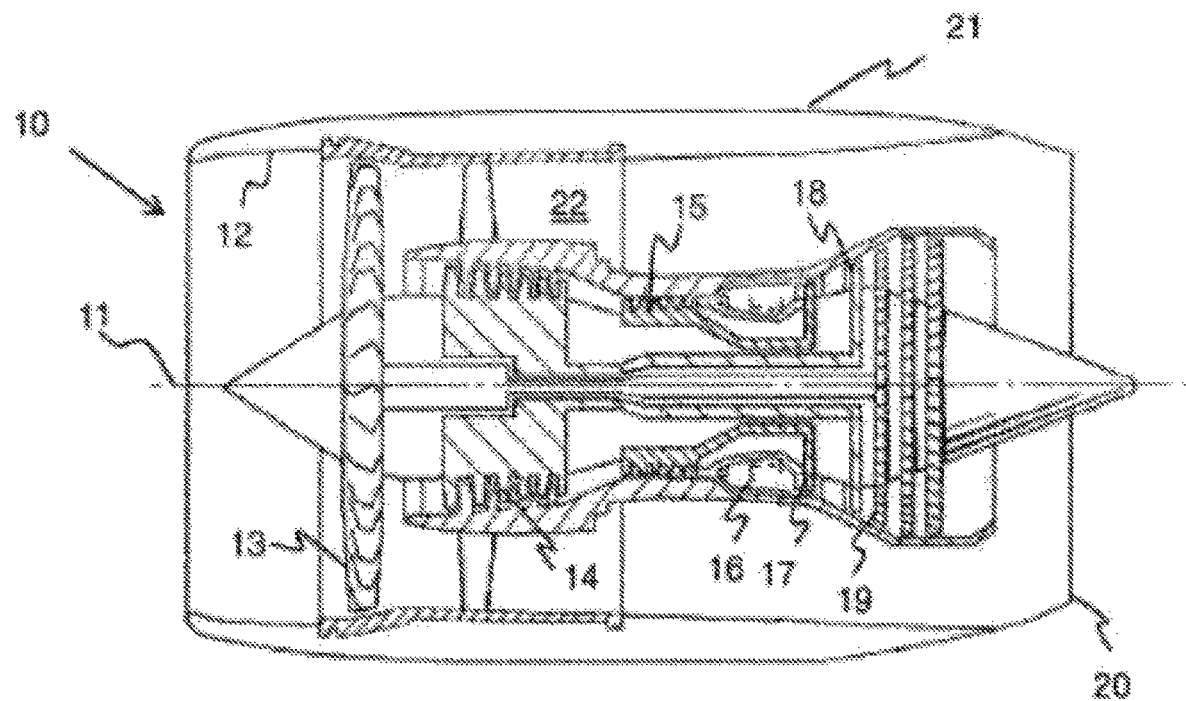
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate-pressure compressor 14, a high-pressure compressor 15, combustion section 16, a high-pressure turbine 17, an intermediate-pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate-pressure compressor 14 and a second air flow which passes through a bypass duct 22 to provide propulsive thrust. The intermediate-pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high-, intermediate- and low-pressure turbines 17, 18, 19 before being exhausted through the nozzle 20 to provide additional propulsive thrust. The high—17, intermediate—18 and low—19 pressure turbines drive respectively the high-pressure compressor 15, intermediate-pressure compressor 14 and fan 13, each by suitable interconnecting shaft.

Figure 2:
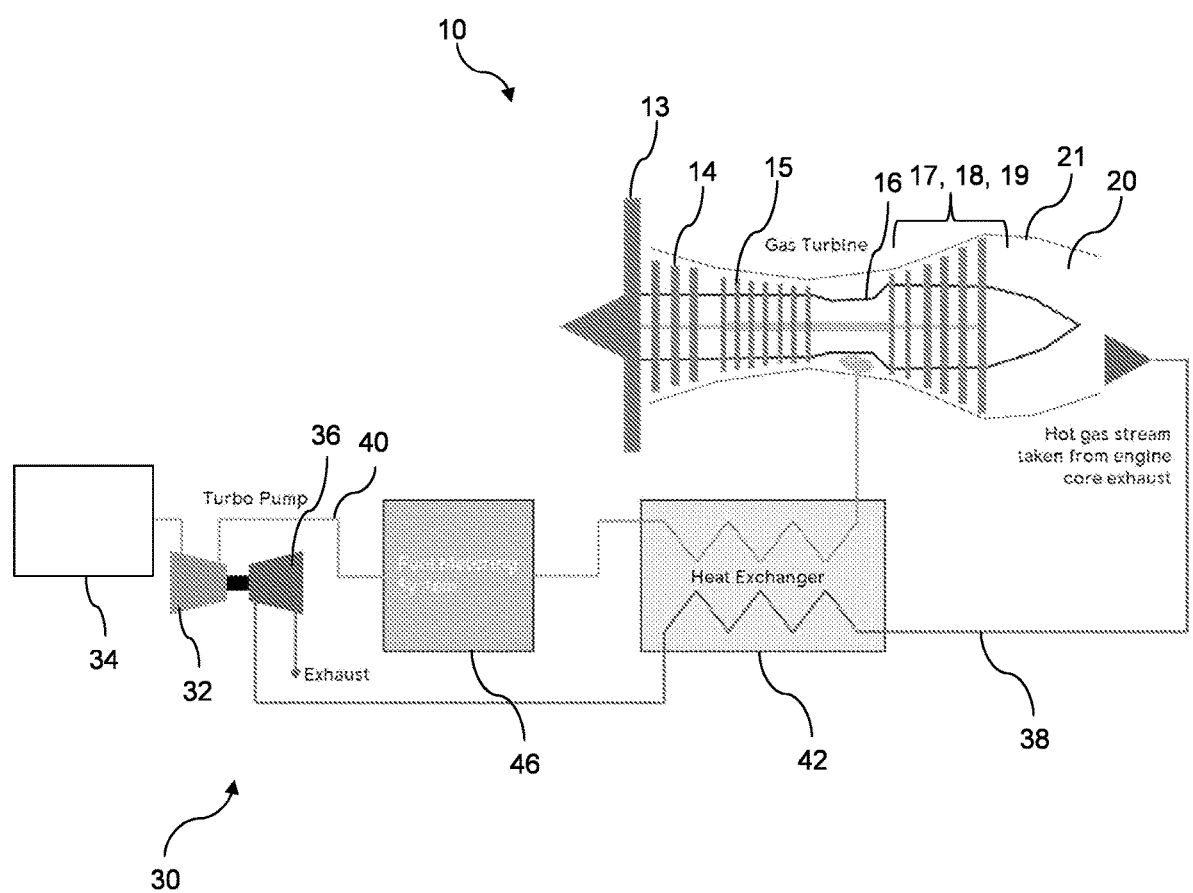
FIG. 2 is a schematic representation fuel system according to an embodiment.

With reference to FIG. 2, the gas turbine engine 10 is shown connected to a fuel system 30 according to an exemplary arrangement of the present disclosure. The fuel system 30 and the gas turbine engine 10 may be configured to be provided in a vehicle (e.g., an aircraft).

The fuel system 30 includes a fuel pump 32, which is a turbo pump, arranged in fluid communication with a fuel reservoir 34. The fuel system 30 also includes a driving turbine 36 configured to drive the fuel pump 32. The driving turbine 36 is fluidly connected to a core exhaust (e.g., the nozzle 20) of the gas turbine engine 10, such that an air feed 38 from the core exhaust (e.g., a hot gas stream) is directed to drive the driving turbine 36, and thereby drive the fuel pump 32.

By using the air feed 38 from the core exhaust of the gas turbine engine 10 to drive the driving turbine 36 which, in turn drives the fuel pump 32, the present inventors have found that the fuel pump 32 can be operated at rotational speeds high enough to pump liquid hydrogen within the gas turbine engine 10 without the need for traditional drives/gears and without the need for burning fuel to drive the driving turbine 36.

The fuel system 30 further includes a fuel line 40 which fluidly connects the fuel pump 32 to the combustion section 16 of the gas turbine engine 10. A heat exchanger 42, of the fuel system 30, is arranged to provide thermal communication between the fuel line 40 and the air feed 38. In this way, the heat exchanger 42 effects cooling of the air within the air feed prior to it driving the driving turbine 36.

The heat exchanger 42 is provided downstream in core exhaust flow of the core exhaust nozzle 20, and upstream in core exhaust flow of the turbine 36. Consequently, the temperature of the exhaust flow is reduced, while pressure may be retained, thereby reducing the material requirements for the turbine 36. The heat exchanger 42 is provided downstream, in fuel flow of the fuel pump 32, and upstream in fuel flow of the combustor 16. As such, the fuel is heated by the heat exchanger 42 after it is pumped while enables the fuel to be pumped at a lower temperature (thereby reducing the work required to raise the pressure of the fuel), while ensuring the required combustion temperature is reached prior to delivery to the combustor 16. Additionally, in view of the location of the heat exchanger, the temperature difference between the hot exhaust gases and pumped fuel is maximised, thereby reducing the size of the heat exchanger for a given final temperature of the fuel prior to delivery to the combustor 16.

By using heat exchange from the air feed 38 from the core exhaust of the gas turbine engine 10 to heat fuel within the fuel line 40, the fuel can be heated to a temperature required for entry into the combustion section 16 of the gas turbine engine 10, which increases the efficiency of the engine 10 whilst minimising the additional heat input into the fuel system 30.

The fuel system 30 shown in FIG. 2, includes both the driving turbine 36 and the heat exchanger 42. Accordingly, the air feed 38 from the core exhaust of the engine 10 can both drive the driving turbine 36 to effect pumping of the fuel and pre-heat the pumped fuel prior to entry into the combustion section 16 of the gas turbine engine 10.

The fuel reservoir 34 is configured to contain liquid hydrogen. For example, the fuel reservoir 34 may be a cryogenic fuel reservoir, as would be understood by the skilled person. Accordingly, the cryogenic fuel reservoir may be configured (e.g., thermally insulated) such that it can store liquid hydrogen at a temperature of around 25K. A portion of the fuel line 40 which connects the fuel reservoir 34 to the fuel pump 32 includes cryogenic pipework, which can withstand and maintain the cold temperature of the liquid hydrogen. The fuel reservoir 34 is located proximate (e.g., adjacent to the fuel pump 32) in order to minimise the pipework (e.g., the cryogenic pipework), between the fuel reservoir 34 and the fuel pump 32.

The fuel system 30 includes a fuel metering unit 46 for metering flow of fuel to the fuel pump 32. The fuel metering unit 46 is fluidly coupled to the fuel line 40 upstream from the heat exchanger 42, as shown in FIG. 2.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A fuel system for a gas turbine engine having a combustion section, a turbine section and a core exhaust downstream of the turbine section with respect to gas flow through the gas turbine engine, the system comprising:
    a fuel pump for fluid communication with a hydrogen fuel reservoir;
    a fuel line extending from the fuel pump to the combustion section of the gas turbine engine, the fuel pump and the fuel line fluidly connecting the hydrogen fuel reservoir and the combustion section;
    a driving turbine for driving the fuel pump;
    an exhaust feed pathway extending from the core exhaust to the driving turbine and configured to carry exhaust from the core exhaust to drive the driving turbine; and
    a heat exchanger located in the exhaust feed pathway that transfers heat from the exhaust in the exhaust feed pathway to fuel in the fuel line.

2. A fuel system according to claim 1, wherein the fuel pump comprises a turbo pump.

3. A fuel system according to claim 1, wherein the hydrogen fuel reservoir comprises a cryogenic fuel reservoir.

4. An aircraft comprising a fuel system according to claim 1.

5. A method of operating a fuel system in a gas turbine engine having a combustion section, a turbine section and a core exhaust downstream of the turbine section with respect to gas flow through the gas turbine engine, the method comprising:
    powering a driving turbine using exhaust from the core exhaust flowing through an exhaust feed pathway extending from the core exhaust to the driving turbine;
    providing fuel to a fuel pump from a hydrogen fuel reservoir;
    driving, by the driving turbine, the fuel pump to pump the fuel along a fuel line extending from the fuel pump to the combustion section of the gas turbine engine; and
    heating the fuel within the fuel line by a heat exchanger located in the exhaust feed pathway in which heat is transferred from the exhaust carried by the exhaust feed pathway to the fuel within the fuel line.

6. A method according to claim 5, wherein the fuel is liquid hydrogen.

7. The fuel system of claim 1, further comprising:
    a fuel metering unit fluidically positioned upstream from the heat exchanger with respect to fuel flow direction from the fuel pump to the combustion section.

8. The method of claim 6, further comprising:
    metering the fuel by a fuel metering unit fluidically positioned upstream from the heat exchanger with respect to fuel flow direction from the fuel pump to the combustion section.

* * * * *